United States Patent Office 3,395,981
Patented Aug. 6, 1968

3,395,981
METHOD OF MANUFACTURING ALUMINUM NITRIDE
Werner Kischio, Aachen, Germany, assignor to North American Philips Company Inc., New York, N.Y., a corporation of Delaware
No Drawing. Filed Feb. 14, 1966, Ser. No. 527,059
Claims priority, application Germany, Mar. 10, 1965, N 26,357
3 Claims. (Cl. 23—192)

ABSTRACT OF THE DISCLOSURE

Aluminum nitride of high purity produced by heating aluminum zinc alloy bars in an ammonium gas atmosphere.

---

The invention relates to the manufacturing of aluminum nitride from aluminum and ammonia gas.

According to a known method of producing aluminum nitride, powdered aluminum is converted to the nitride by heating with nitrogen or ammonia gas according to the reaction $2Al+N_2 \rightarrow 2AlN$. This known method generally results in products of an insufficient purity as the aluminum powder cannot be obtained in the desired purity. Thus in addition to considerable quantities of oxygen, it usually contains silicon and iron. Since aluminum is always coated with an oxide film, the aluminum nitride from aluminum powder contains a comparatively large amount of aluminum oxide (up to approximately 5 to 6%) which is undesirable for many purposes.

A principal object of this invention, therefore, is to provide a method for obtaining aluminum nitride of a higher degree of purity.

According to my invention I do not use powdered aluminum for the conversion, but compact bars in the form of aluminum zinc alloys. I do not use pure aluminum bars, as experiments have proved that when converting compact aluminum bars at $>1200°$ C. with ammonia gas, a product is obtained which is very hard and contains a large amount of metallic aluminum. I have found that aluminum nitride of a great purity is obtained when compact bars of an aluminum-zinc alloy are subjected to the action of ammonia gas at a temperature between 900 and 1200° C.

As compared with pure aluminum, the temperature at which the reaction of the aluminum-zinc alloy with ammonia starts, is approximately 100 to 200° C. lower, in accordance with the quantity of zinc which is present in the alloy. For example, at a weight ratio Al–Zn of approximately 1:1, the reaction starts at approximately 1000° C.

Zinc nitride only temporarily is formed during the reaction. At approximately 800° C. the zinc nitride is again decomposed to zinc and nitrogen. The boiling point of the zinc is 907° C. In the aluminum nitride obtained during the reaction, zinc could in most of the cases not be determined spectroscopically; the concentration consequently was under 0.005% by weight. The product obtained in the reaction contains 98 to 99% by weight of aluminum nitride, the remainder aluminum. The product is sintered together somewhat and can easily be pulverized.

Good results are obtained when the zinc content of the alloy lies between approximately 5 and 20% by weight, preferably, however, alloys which contain approximately 10 to 15% by weight of zinc are used. In that case the conversion temperature is approximately 1100 to 1150° C.

The aluminum nitride manufactured according to the invention may be used as a crucible material, namely for crucibles which are to be used in the manufacture of semiconductors from AlAs and AlP. Since in these compounds, often zinc is to be incorporated as a doping material, a possible low zinc content in the material of the crucible would not be detrimental. The AlN contains practically no oxygen at all so that any undesirable oxygen doping of the semiconductor with oxygen is avoided.

The method according to the invention will now be described in greater detail with reference to the following example.

Example

Aluminum (99.998%) is melted in a corundum crucible under a protective gas (Argon) and then zinc is added (99.999%) until the melt has the desired zinc concentration. Bars are moulded from the melt. The mould for the bars consists of aluminum.

A bar of an alloy with 10% of zinc and 90% of aluminum was provided in a corundum crucible. The bar had a weight of approximately 15 g. The alloy was then heated in a furnace in an ammonia current. At approximately 1130° C. the strongly exothermal reaction started, zinc distilling off. During the main reaction a strong ammonia current was passed over the material. After approximately 15 minutes the conversion was completed. The reaction product, aluminum nitride, was allowed to cool in the ammonia current.

While I have described by invention in connection with specific embodiments and applications, other modifications thereof will be readily apparent to those skilled in this art without departing from the spirit and scope of the invention as defined in the appended claims.

What I claim is:
1. A method of manufacturing aluminum nitride comprising heating at about 900° C. to 1200° C. compact bars of an aluminum-zinc alloy in an ammonia gas atmosphere.
2. The method of claim 1 wherein the alloy contains from about 5 to 20% by weight of zinc.
3. The method of claim 1 wherein the alloy contains from about 10 to 15% by weight of zinc.

References Cited

UNITED STATES PATENTS

| | | | |
|---|---|---|---|
| 1,803,720 | 5/1931 | Miner | 23—192 |
| 2,198,673 | 4/1940 | Loevenstein | 75—68 |
| 2,810,637 | 10/1957 | Spendlove | 75—68 |
| 3,243,281 | 3/1966 | Schmidt | 76—68 |

FOREIGN PATENTS 42,081   11/1925   Norway.

OTHER REFERENCES

Supplement to: Mellor's Comprehensive Treatise on Inorganic and Theoretical Chemistry; vol. VII, supplement 1; John Wiley & Sons, New York, 1964, p. 162.

OSCAR R. VERTIZ, Primary Examiner.
G. PETERS, Assistant Examiner.